United States Patent
Hosaka

(10) Patent No.: US 8,797,591 B2
(45) Date of Patent: Aug. 5, 2014

(54) APPARATUS, SYSTEM, AND METHOD OF FORMING IMAGE USING INKJET PRINTING, AND RECORDING MEDIUM STORING INKJET PRINTING CONTROL PROGRAM

(75) Inventor: Shigetoshi Hosaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 77 days.

(21) Appl. No.: 13/489,780

(22) Filed: Jun. 6, 2012

(65) Prior Publication Data
US 2012/0314259 A1 Dec. 13, 2012

(30) Foreign Application Priority Data
Jun. 10, 2011 (JP) ................................. 2011-130426

(51) Int. Cl.
*H04N 1/405* (2006.01)
(52) U.S. Cl.
USPC .............................. 358/1.4; 358/1.7; 358/3.2
(58) Field of Classification Search
USPC ................... 358/1.4, 1.7–1.9, 2.1, 3.06–3.09, 358/3.13–3.15, 3.2, 3.21, 3.23–3.28, 1.18
See application file for complete search history.

(56) References Cited

U.S. PATENT DOCUMENTS

| | | | |
|---|---|---|---|
| 7,438,231 B2 * | 10/2008 | Cordery et al. | 235/462.01 |
| 8,040,567 B2 | 10/2011 | Hosaka et al. | |
| 2007/0091135 A1 | 4/2007 | Hosaka et al. | |
| 2010/0231631 A1 | 9/2010 | Hosaka | |

FOREIGN PATENT DOCUMENTS

| | | |
|---|---|---|
| JP | 08002003 A | 1/1996 |
| JP | 2003089199 A | 3/2003 |

* cited by examiner

*Primary Examiner* — Thomas D Lee
*Assistant Examiner* — Stephen M Brinich
(74) *Attorney, Agent, or Firm* — Harness, Dickey & Pierce, P.L.C.

(57) ABSTRACT

An image forming apparatus shifts dots of a recording dot pattern by half of a dot pitch in a main scanning direction to generate a shift dot pattern, corrects a jagged outline of the shift dot pattern caused by shifted dots using correction dots to generate a corrected shift dot pattern, and determines an increased number of ink droplets to be additionally ejected from one or more of a plurality of nozzles to form the shifted dot or the correction dot of the corrected shift dot pattern with an increased dot size, based on an estimated shift value indicating the displacement in landing position of ink droplets forming the dot of the recording dot pattern.

15 Claims, 13 Drawing Sheets

SPACE

NO SPACE ic # APPARATUS, SYSTEM, AND METHOD OF FORMING IMAGE USING INKJET PRINTING, AND RECORDING MEDIUM STORING INKJET PRINTING CONTROL PROGRAM

CROSS-REFERENCE TO RELATED APPLICATIONS

This patent application is based on and claims priority pursuant to 35 U.S.C. §119 to Japanese Patent Application No. 2011-130426, filed on Jun. 10, 2011, in the Japan Patent Office, the entire disclosure of which is hereby incorporated herein by reference.

BACKGROUND

1. Field

The present invention generally relates to an apparatus, system, and method of forming an image using inkjet printing, and recording medium storing an inkjet printing control program.

2. Background

The recent inkjet recording apparatuses are capable of producing barcodes with improved barcode appearance. For example, as described in Japanese Patent Application Publication Nos. H08-002003 and 2003-089199, the background inkjet recording apparatus shifts dot positions of a line of dot pattern data in the main scanning direction with respect to a line adjacent to the line in the sub-scanning direction, thus suppressing excessive ink from being adhered to the recording sheet when ink droplets are ejected onto the recording sheet.

The background inkjet recording apparatuses, however, suffer from degradation in image quality that may be attributable to displacement in landing positions of ink droplets. Inkjet printing is performed by ejecting droplets of ink from an inkjet head that reciprocates in the main scanning direction. If the ink droplets land in different positions on the recording sheet, white spots, overlapped lines, or jaggies may be observed in the printed image.

SUMMARY

In view of the above, one aspect of the present invention is to provide an apparatus, system, and a method of forming an image using inkjet printing, each capable of suppressing degradation in printed image that may be attributable to displacement in landing positions of ink droplets, and a recording medium storing an inkjet printing control program.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1A:
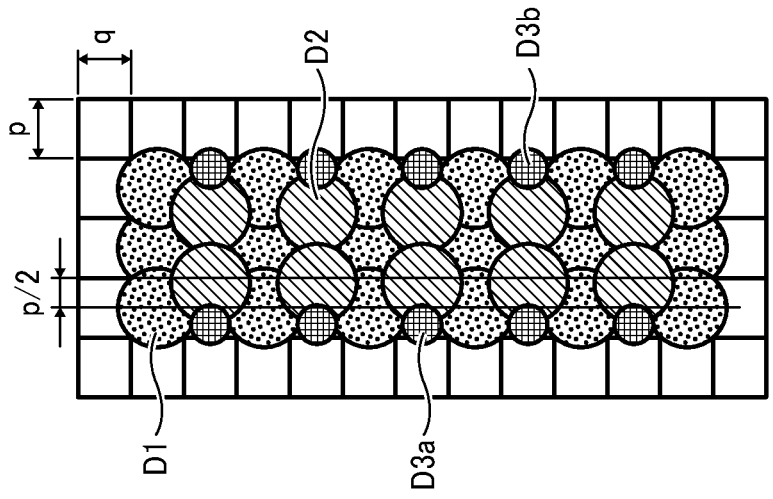
FIG. 1A is a dot arrangement of a shift dot pattern that is generated by shifting dots of a recording dot pattern of image data, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following examples, an inkjet printer is provided, which is capable of printing an image while suppressing degradation in image quality that may be caused due to displacement in landing positions of ink droplets. More specifically, in the following examples, the inkjet printer identifies a barcode area of image data to be printed, and prints the barcode area with improved image quality. For the detected barcode area, the inkjet printer shifts dot positions of every other line of a dot pattern forming the bar by half of a dot pitch to generate a shift dot pattern. The inkjet printer further adds small-size dots, or replaces the dots of the shift dot pattern with small-size dots, to correct jaggies of the shift dot pattern. The inkjet printer further increases a number of ink droplets forming the corrected shift dot pattern to increase the dot size of a dot in the shift dot pattern or a correction dot added to the shift dot pattern, based on the estimated value of shift in landing positions of ink droplets. This suppresses negative influences caused by displacement in landing positions of ink droplets.

Figure 1B:
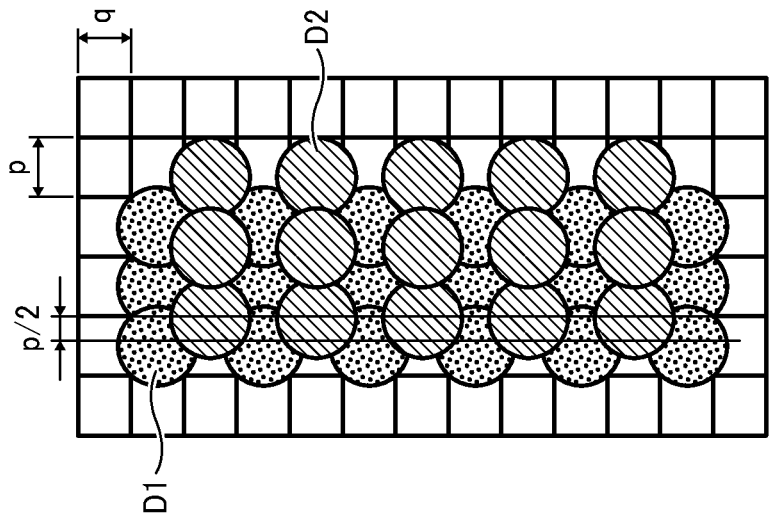
FIG. 1B is a dot arrangement of a corrected shift dot pattern that is generated by adding the correction dots to the shift dot pattern of FIG. 1A, according to an example embodiment of the present invention.

FIG. 1A illustrates a dot arrangement of a shift dot pattern that is generated by shifting dots of a recording dot pattern in a barcode area of image data. FIG. 1B illustrates a dot arrangement of the shift dot pattern of FIG. 1A after being corrected by adding correction dots. In FIGS. 1A and 1B, "p" denotes a dot pitch of the dot pattern in the main scanning direction, and "q" denotes a dot pitch of the dot pattern in the sub-scanning direction. For simplicity, it is assumed that the shift dot pattern of FIG. 1A is generated based on a recording dot pattern of FIG. 8, which will be described later.

Figure 22B:
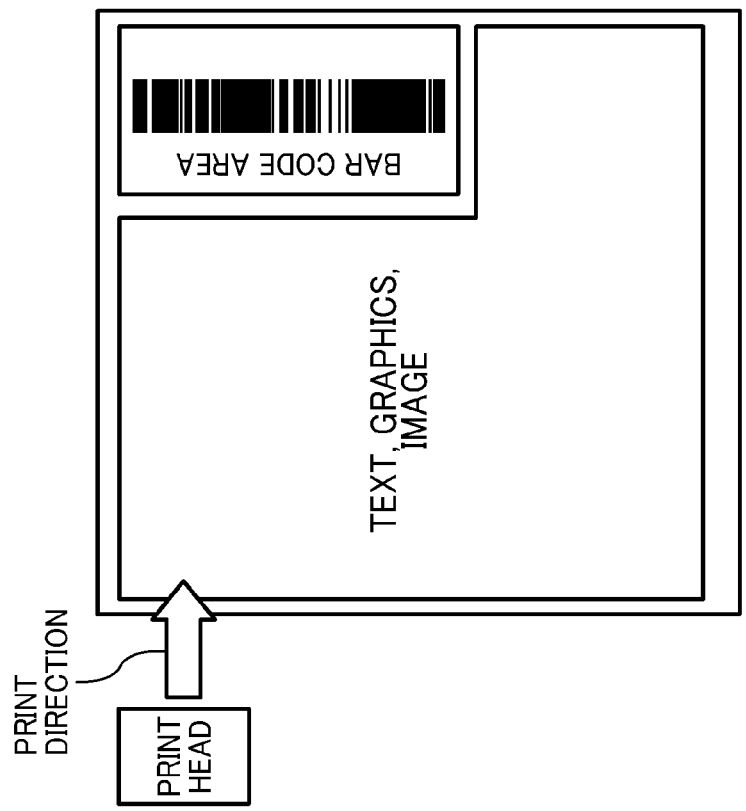
FIG. 22B is an illustration for explaining example image data to be printed by the image forming apparatus of FIG. 2, when bars of barcode data are arranged in the sub-scanning direction.
Figure 22A:
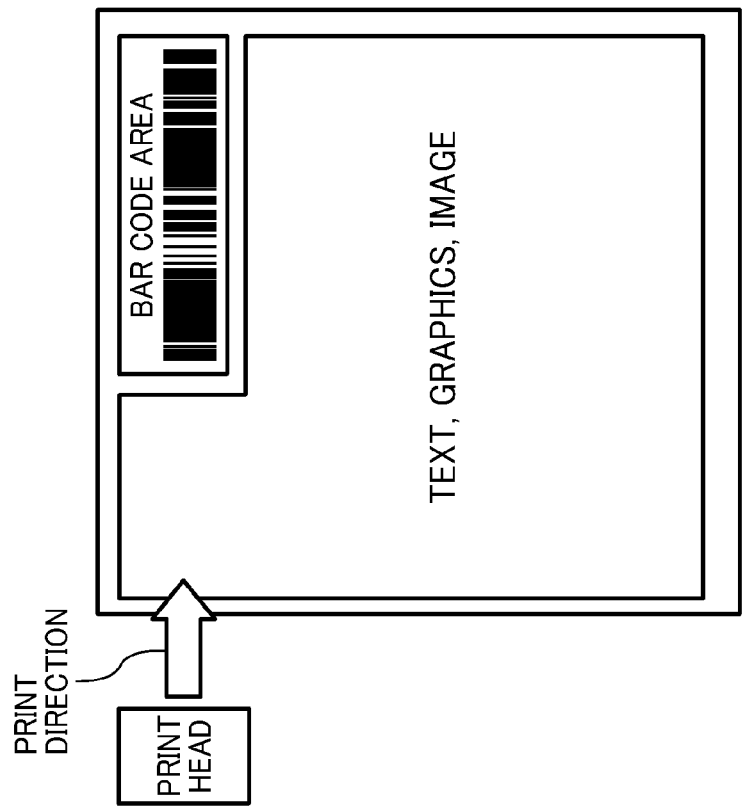
FIG. 22A is an illustration for explaining example image data to be printed by the image forming apparatus of FIG. 2, when bars of barcode data are arranged in the main scanning direction.

The dots D1, each expressed in dotted circle, are dots of the recording dot pattern that form a bar in a barcode area, which are to be printed without being corrected. In this example, it is assumed that the bars in the barcode area are arranged as illustrated in FIG. 22A. For each line, the dots D1 are arranged in the main scanning direction by the dot pitch "p". In this example, each dot D1 is to be printed in black color. The dots D2, each expressed in diagonal line circle, are dots of the shift dot pattern. The dots D2 of the shift dot pattern are generated by shifting the dots D1 of the recording dot pattern, by p/2 in the main scanning direction, such that every other lines of the dots D1 that are adjacent in the sub-scanning direction via the shift dot pattern are still made continuous with the shift dot pattern placed therebetween, while reducing an area where the dots overlap with one another.

Referring to FIG. 1B, the dots D3a and D3b, each expressed in lattice pattern circle, are correction dots to be added to the shift dot pattern of FIG. 1A so as to correct an outline of the shift dot pattern forming the bar in the barcode area. Referring back to FIG. 1A, as the dots D2 of the shift dot pattern at the left side are generated by shifting the dots D1 of the recording dot pattern toward the inside of the barcode area in the main scanning direction by p/2, a space is generated near the outline of the shift dot pattern. To fill in the space, the correction dot D3a is added as illustrated in FIG. 1B. The dot D2, which runs off the right side of the outline of the shift dot pattern forming the bar, is replaced by the correction dot D3b. The correction dots D3a and D3b each have a dot size that is smaller than that of the dots D1 and D2. With the correction dots D3a and D3b, the outline of the shift dot pattern forming the bar in the barcode area is made smooth with respect to the outline of the unshifted recording dot pattern. Based on the recording dot pattern and the corrected shift dot pattern, an image of each bar in the barcode area is formed with improved quality.

(Generating a Shift Dot Pattern)

Figure 2:
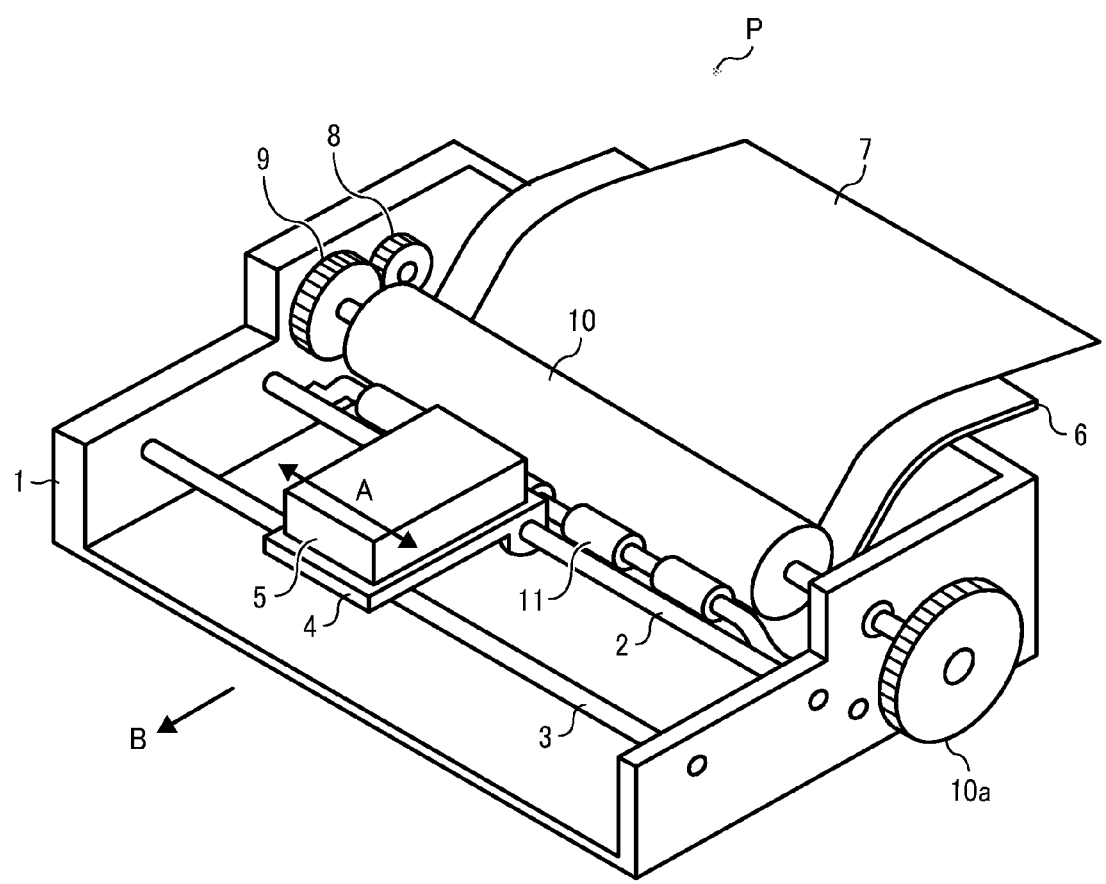
FIG. 2 is a perspective view illustrating a mechanical structure of an image forming apparatus, according to an example embodiment of the present invention.
Figure 3:
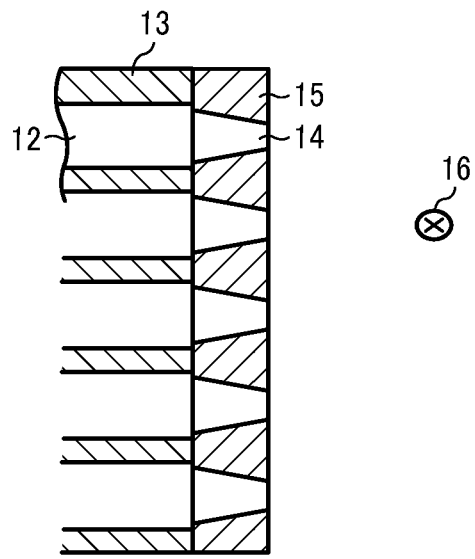
FIG. 3 is a cross-sectional view illustrating a tip portion of an inkjet print head of the image forming apparatus of FIG. 2.
Figure 4:
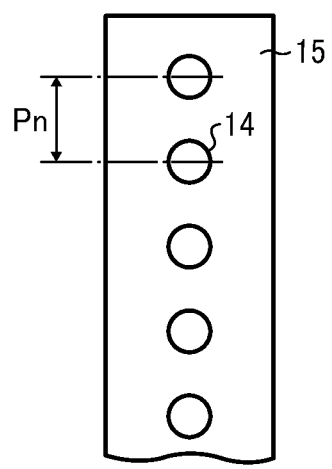
FIG. 4 is a front side view illustrating a nozzle plate of the inkjet print head of the image forming apparatus of FIG. 2, according to an example embodiment of the present invention.
Figure 5:
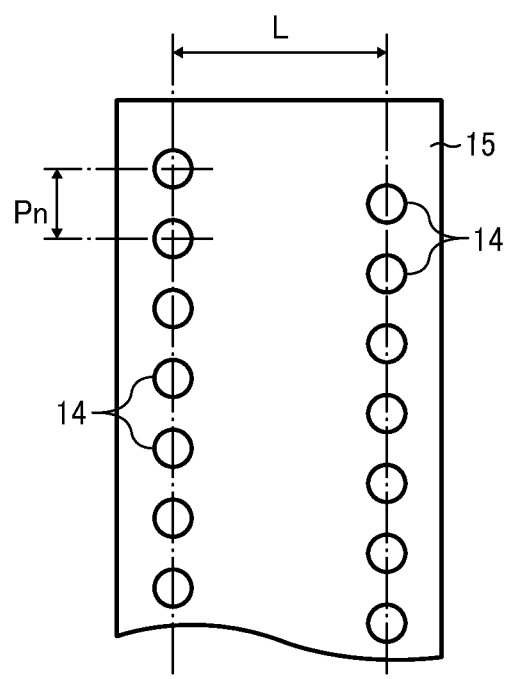
FIG. 5 is a front side view illustrating a nozzle plate of the inkjet print head of the image forming apparatus of FIG. 2, according to an example embodiment of the present invention.
Figure 6:
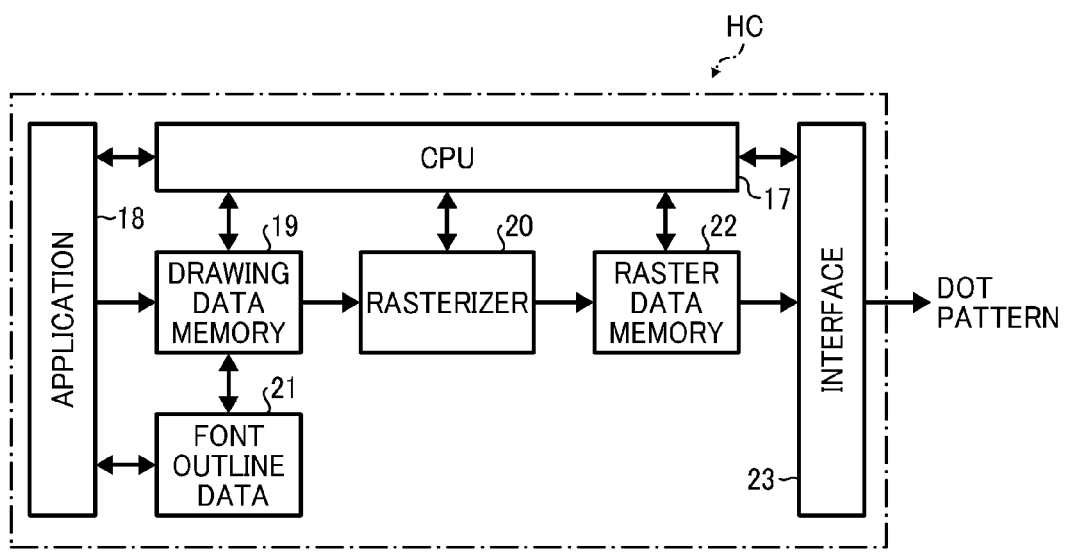
FIG. 6 is a schematic block diagram illustrating an electrical circuit structure of a host computer that may send an instruction to the image forming apparatus of FIG. 2, according to an example embodiment of the present invention.
Figure 7:
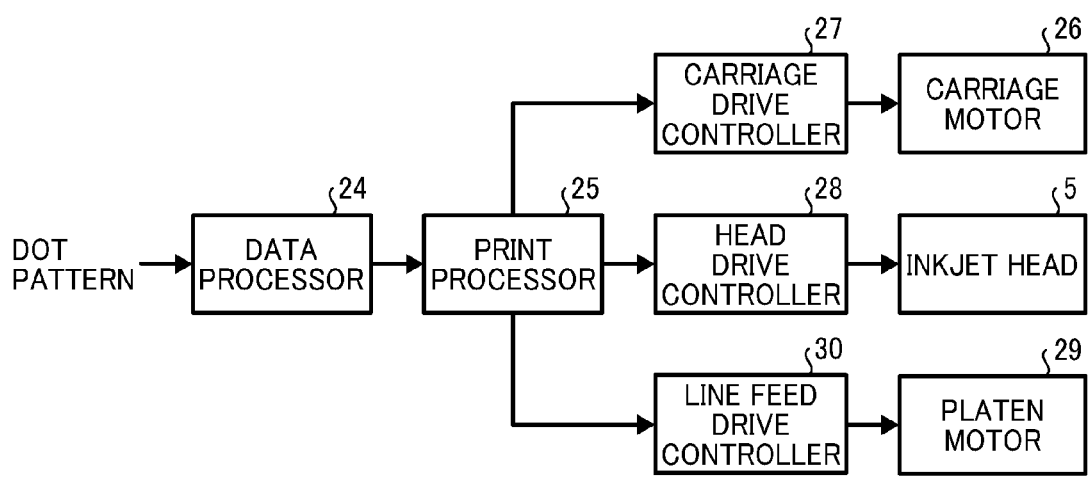
FIG. 7 is a schematic block diagram illustrating an electrical circuit structure of a control section of the image forming apparatus of FIG. 2, according to an example embodiment of the present invention.

FIG. 2 is a perspective view illustrating a mechanical structure of an image forming apparatus according to an example embodiment of the present invention. FIG. 3 is a cross-sectional view illustrating a tip portion of an inkjet print head of the image forming apparatus of FIG. 2. FIG. 4 is a front side view illustrating a nozzle plate of the inkjet print head of the image forming apparatus of FIG. 2, according to an example embodiment of the present invention. FIG. 5 is a front side view illustrating a nozzle plate of the inkjet print head of the image forming apparatus of FIG. 2, according to an example embodiment of the present invention. FIG. 6 is a schematic block diagram illustrating an electrical circuit structure of a host computer that sends a print instruction to the image forming apparatus of FIG. 2. FIG. 7 is a schematic block diagram illustrating an electrical circuit structure of the image forming apparatus of FIG. 2.

As illustrated in FIG. 2, the image forming apparatus, which is implemented by a serial-type inkjet printer P, mainly includes a frame 1, guide rails 2 and 3 that laterally bridge the frame 1 between opposing walls of the frame 1, a carriage 4 that is provided on the guide rails 2 and 3 in a manner that is slidable along the guide rails 2 and 3, an inkjet print head 5 mounted on the carriage 4, a guide plate 6, gears 8 and 9, a platen 10 provided with a feeding knob 10a, and a plurality of pressure rollers 11. In operation, the carriage 4 is scanned in the main scanning direction "A", which is bi-directional, with a carriage motor 26 (FIG. 7) for a number of times that is determined based on the head resolution and the printing resolution. The rotational force of a platen motor 29 (FIG. 7) is transmitted via the gears 8 and 9 to the platen 10 to cause a recording sheet 7, which is set on the guide plate 6, to be transferred in the sheet transfer direction B. In this example, the sheet transfer direction B is the same as the sub-scanning direction B, and is orthogonal to the main scanning direction A.

The pressure rollers 11 are made in closely contact with an outer circumferential surface of the platen 10. In printing operation, the inkjet printer P transfers the recording sheet P in the sub-scanning direction B, while scanning the carriage 4 and the inkjet print head 5 in the main scanning direction A. With ink droplets supplied by the inkjet print head 5, an image is formed on the recording sheet 7.

As illustrated in FIGS. 3 and 4, the inkjet print head 5 includes a nozzle plate 15. The nozzle plate 15 includes a plurality of liquid chambers 12, a set of liquid chamber walls 13 that form each one of the liquid chambers 12, and a plurality of nozzles 14 that are provided for each one of the liquid chambers 12. Through the nozzle 14, an ink droplet 16 is ejected from the liquid chamber 12.

The inkjet print head 5 may eject the ink droplet using any desired ink ejection method including the Bubble Jet (Registered Trademark) method in which a voltage is applied to a heater in the chamber 12 to cause rapid vaporization of the ink, the Piezoelectric method in which a voltage is applied to change the shape of the piezoelectric material to force the ink droplet from the nozzle, and the electrostatic method in which a voltage is applied between electrodes to generate an electrostatic force. Using any desired ink ejection method, droplets of ink are ejected from any desired chamber 12 through the corresponding nozzle 14.

In this example illustrated in FIG. 4, the plurality of nozzles 14 may be arranged in one array in the direction that is orthogonal to the main scanning direction A (FIG. 2). Alternatively, as illustrated in FIG. 5, the plurality of nozzles 14 may be arranged in two arrays that are parallel with each other, each along the main scanning direction A. In either case, a nozzle pitch Pn, which is a distance between the nozzles 14 that are adjacent in the sub-scanning direction, has a value that is twice of a recording pitch M. More specifically, the nozzle pitch Pn is equal to 2M. In this example, it is assumed that 64 nozzles 14 are arranged in the inkjet print head 5.

Further, in this example, it is assumed that the inkjet printer P does not have a function of generating a recording dot pattern of image data in response to a request for printing an image based on the image data. More specifically, an information processing apparatus such as a host computer HC is connected to the inkjet printer P through a network to cause the inkjet printer P to form an image based on the recording dot pattern of image data that is generated by the host computer HC. The host computer HC is installed with any desired application capable of generating an instruction for printing ("print instruction"). When the print instruction is issued, a print driver, which may be embedded into the host computer HC in the form of software, processes the print instruction to rasterize image data to be printed into a recording dot pattern of image data, and sends the recording dot pattern of image data to the inkjet printer P.

The host computer HC is implemented by a general-purpose computer, which includes a processor, a memory, a user interface, and a network interface. As illustrated in FIG. 6, the host computer HC includes a controller 17 that may be implemented by a central processing unit (CPU) 17, application software ("application") 18, a drawing data memory 19, a rasterizer 20, font outline data 21, a raster data memory 22, and an interface 23.

Under control of the controller 17, the application 18, which runs on the operating system, generates the print instruction for drawing images or texts such as characters, and temporarily stores the print instruction in the drawing data memory 19. The print instruction may describe a position, a thickness, or a shape of a line to be drawn, or a font or a size of a character to be written, in a specific print description language.

The rasterizer 20 interprets the print instruction, which is stored in the drawing data memory 19. In one example, the rasterizer 20 converts an instruction for drawing a line to a dot pattern according to the position, thickness, or shape of the line to be drawn. In another example, the rasterizer 20 converts an instruction for drawing a character to a dot pattern according to the position or size of the character, which is specified by character outline data that is obtained from the font outline data 21. The rasterizer 20 rasterizes the print instruction into a recording dot pattern, based on the orthogonal grids. The data of recording dot pattern, which may be referred to as raster data, is stored in the raster data memory 22. For example, the recording dot pattern of FIG. 8 may be generated. The interface 23 sends the data of recording dot pattern, which is stored in the raster data memory 22, to the inkjet printer P through a network.

Referring to FIG. 7, the control section of the inkjet printer P includes a data processor 24, a print processor 25, a carriage drive controller 27, a head drive controller 28, a line feed drive controller 30, the carriage motor 26, the inkjet print head 5, and the platen motor 29. The data processor 24 and the print processor 25 are connected with each other. The print processor 25 is connected, respectively, to the carriage drive controller 27, the head drive controller 28, and the line feed drive controller 30.

The data processor 24 receives the data of recording dot pattern, which is sent from the host computer HC via a network interface. The data processor 24 sends the data of recording dot pattern to the head drive controller 28 via the print processor 25. The head drive controller 28 causes the inkjet print head 5 to eject ink droplets from the desired nozzle 14 (FIG. 3) onto the recording sheet 7. The carriage drive controller 27 drives the carriage motor 26 to scan the carriage 4 in the main scanning direction A. The line feed drive controller 30 drives the platen motor 29 to rotate the platen 10 to transfer the recording sheet 7 in the sub-scanning direction.

In this example, the data processor 24 is provided with the function of generating a shift dot pattern to be printed by the inkjet print head 5, based on the recording dot pattern received from the host computer HC. The data processor 24 is further provided with the function of correcting the outline of the shift dot pattern by adding to or replacing with small-size dots to the outline of the shift dot pattern. The data processor 24 may be further provided with the function of determining a dot size of each dot in the shift dot pattern or a dot size of each correction dot.

More specifically, in one example, the data processor 24 is implemented by a microcomputer including a central processing unit and a memory such as a read only memory (ROM), random access memory (RAM), or a nonvolatile RAM (NVRAM). The ROM stores therein various control programs such as a printing control program, a shift dot pattern generating program, a shift dot pattern correction program, and a dot size determining program. Upon execution of the control programs from the ROM onto the RAM, the CPU functions as the data processor 24 to perform operation according to the control programs. Using software, implementation costs tend to be lower.

In another example, the data processor 24 may be implemented by a hardware structure such as in the form of an Application Specific Integrated Circuit (ASIC). With the hardware structure, the processing speed increases when compared to the case of performing correction operation by software. Alternatively, the data processor 24 may be implemented by a combination of software and hardware.

Further, the control programs may be provided in various ways, for example, in the form of a recording medium storing therein the control programs. Alternatively, the control programs may be previously stored in a memory of the inkjet printer P. Alternatively, the inkjet printer P may download the control programs from a network to cause the inkjet printer P to perform image forming operation as described in this specification.

Figure 8:
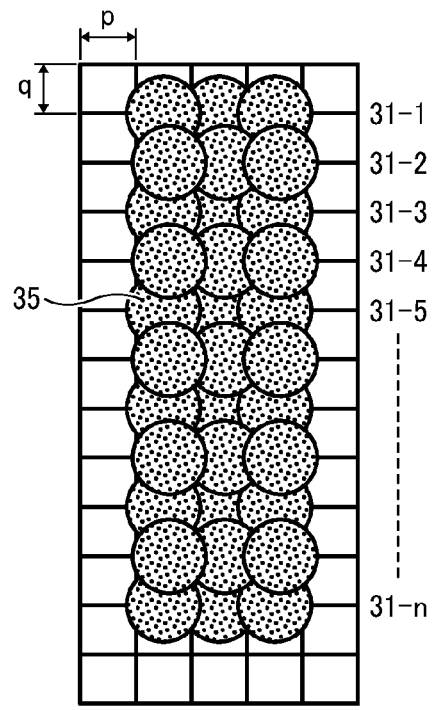
FIG. 8 is an illustration of a recording dot pattern of image data, generated by the host computer of FIG. 6, according to an example embodiment of the present invention.
Figure 9:
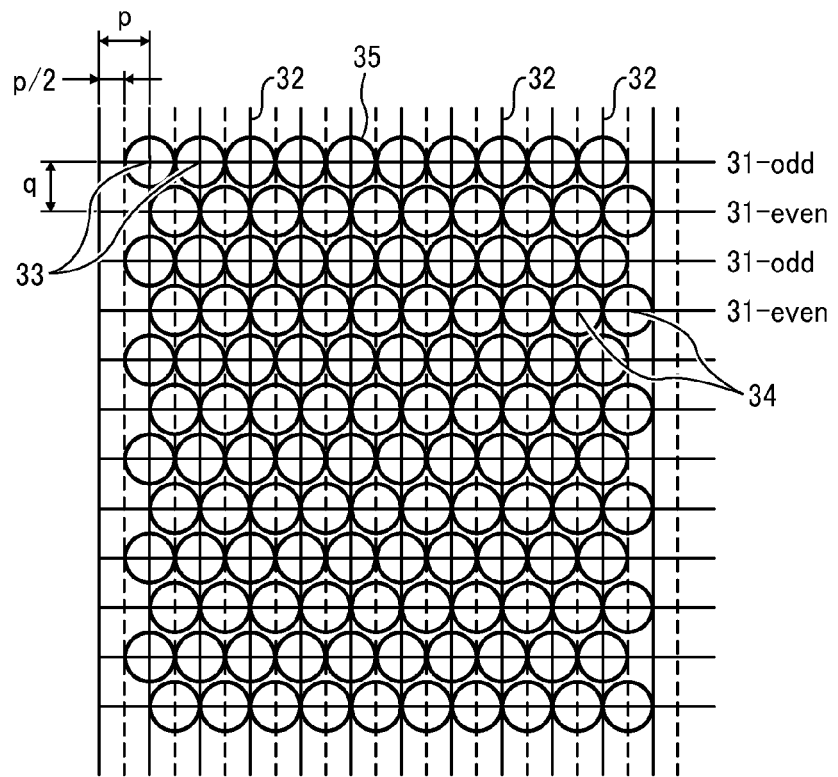
FIG. 9 is an illustration for explaining operation of generating a shift dot pattern based on the recording dot pattern of FIG. 8, performed by the image forming apparatus of FIG. 2, according to an example embodiment of the present invention.
Figure 10:
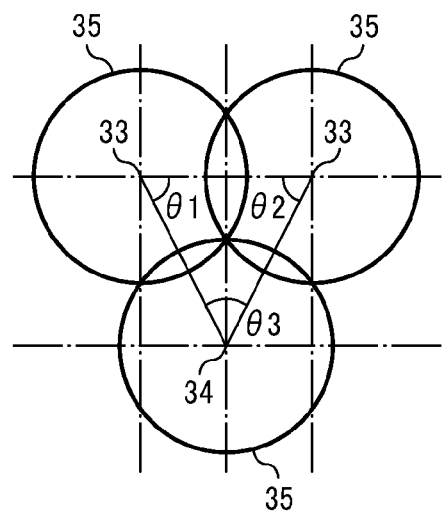
FIG. 10 is an illustration of an enlarged portion of the shift dot pattern of FIG. 9.
Figure 11:
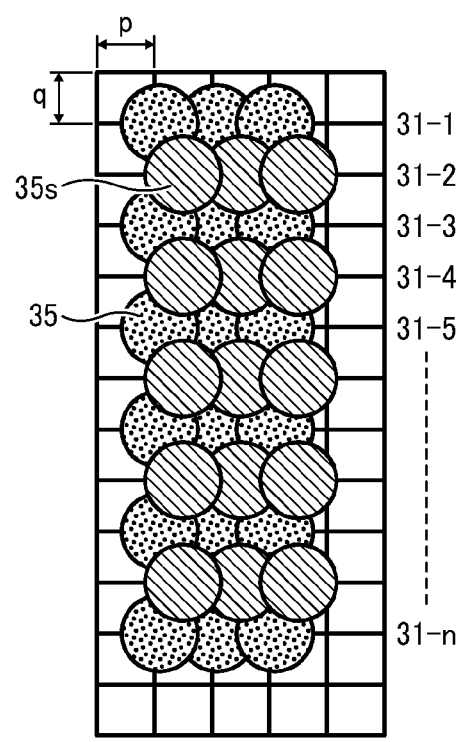
FIG. 11 is an illustration of a dot arrangement of a shift dot pattern, generated by the image forming apparatus of FIG. 2 based on the recording dot pattern of FIG. 8, according to an example embodiment of the present invention.

Now, operation of generating a shift dot pattern is explained according to an example embodiment of the present invention. FIG. 8 illustrates an example recording dot pattern, which is generated by the host computer HC. FIG. 9 illustrates operation of generating a shift dot pattern based on the recording dot pattern of FIG. 8. FIG. 10 illustrates an enlarged portion of the shift dot pattern of FIG. 9. FIG. 11 illustrates a dot arrangement of an example shift dot pattern, which is generated by the inkjet printer P based on the recording dot pattern of FIG. 8.

Referring to FIG. 9, operation of generating a shift dot pattern based on the recording dot pattern of solid image data of FIG. 8 is explained. The dot patterns of FIG. 9, which include the recording dot pattern and the shift dot pattern, are defined by a grid structure formed by a group of horizontal lines 31 and a group of vertical lines 32 that are orthogonal with each other. The horizontal lines 31 are arranged in the sub-scanning direction B (sheet transfer direction B) by dot pitch "q". The vertical lines 32 are arranged in the main scanning direction A (sheet width direction) by dot pitch "p/2".

The dots 35 of the recording dot pattern, each expressed in circle, are positioned where the horizontal lines 31 and the vertical lines 32 intersect. More specifically, for the odd line 31-odd of the horizontal lines 31 that are arranged in the sub-scanning direction B, the recording position of each dot 35 is defined based on the intersect 33 where the odd line 31-odd intersects with every other line of the vertical lines 32 that are arranged by dot pitch "p", which is expressed in solid line.

The dots 35 of the shift dot pattern, each expressed in circle, are positioned where the horizontal lines 31 and the vertical lines 32 intersect. More specifically, for the even line 31—even of the horizontal lines 31 that are arranged in the sub-scanning direction B, the recording position of each dot 35 is defined based on the intersect 34 where the even line 31—even intersects with every other line of the vertical lines 32 that are arranged by dot pitch "p", which is expressed in dashed line.

Accordingly, the intersects 33 and 34 are arranged in the main scanning direction A by the same dot pitch "p", but shifted by p/2 in the main scanning direction A. In this example, the dot pitch "p" in the main scanning direction A is equal to the dot pitch "q" in the sub-scanning direction B. This prevents the printed image that is generated based on the recording dot pattern, from being oblate in the sub-scanning direction.

Referring to FIG. 10, a line segment passing through the intersect 33 of one original dot 35 and the intersect 34 of one shifted dot 35, and a line segment passing through the intersect 33 of the other original dot 35 and the intersect 34 of the shifted dot 35, form an isosceles triangle having angles θ1, θ2, and θ3. The angles θ1, θ2, and θ3 can be expressed using the equations: tan θ1=2, tan θ2=2, and tan(θ3/2)=1/2. With these equations, the values of angles θ1, θ2, and θ3 are respectively obtained as: θ1=63.4 degrees, θ2=63.4 degrees, and θ3=54.2 degrees. The recording positions of the dots can thus be defined as the vertices of the isosceles triangle having angles θ1, θ2, and θ3. More specifically, the circle having the vertice at its center is where the dot 35 is recorded.

Further, in this example, the dot size D of the dot 35, which is expressed by a dot diameter, may be determined as follows. Since the solid image is formed by filling out a specific area with the dots, each dot needs to have a size that is sufficiently large so as to fill out space between the dots. In this example, the dot size D of the dot 35, which is a dot diameter, is defined to be equal to or larger than a diameter of a circumcircle passing through all three vertices 33, 33, and 34. In this example case in which the dot 35 has the dot pitch "p", where p=q, the dot size D is defined to be equal to 5p/4=1.25p. With the dot having the dot size D of 1.25p or greater, the solid image is formed without causing white spots.

In case the inkjet print head 5 has one array of nozzles 14 as illustrated in FIG. 4, the inkjet printer P ejects ink droplets based on the dots 35 of the odd line 31-odd while causing the inkjet print head 5 to be scanned in the main scanning direction A. After transferring the recording sheet 7 by dot pitch q, where q=Pn/2, the inkjet printer P ejects ink droplets based on the dots 35 of the even line 31—even while causing the inkjet print head 5 to be scanned in the main scanning direction A.

Now, operation of printing an image based on the recording dot pattern and the shift dot pattern is explained according to an example embodiment of the present invention. In this example, it is assumed that the arrangement densities of the dots 35 are 300 dots per inch (dpi) in the main scanning direction, and 300 dpi in the sub-scanning direction. The dot pitch p in the main scanning direction and the dot pitch q in the sub-scanning direction are each 84.7 μm. For every other line of the recording dot pattern, the position of the dot 35 that is adjacent with the dot 35 in the sub-scanning direction is shifted by p/2 in the main scanning direction. The average dot size D1, or the average dot diameter D1, of the dot 35 to be formed on the recording sheet 7 is set to 1.25p=1.25*84.7 μm=106 μm. In this example, parameters that define an amount of ink droplets to be ejected and an ink ejection speed of the inkjet print head 5 are previously set based on the value of average dot size D1. With these parameters, the inkjet printer P is able to form the dots 35 on the recording sheet P, without causing space to be generated between the dots 35 while suppressing unnecessary overlap between the dots 35.

Referring to the recording dot pattern of FIG. 8, which is generated by the host computer HC, the lines 31-1, 31-3, . . . , respectively correspond to the odd lines 31—odd of FIG. 9, and the lines 31-2, 31-4, . . . , respectively correspond to the even lines 31—even of FIG. 9. The recording position of each dot 35 is defined based on the intersect 33 where the horizontal line and the vertical line intersect. If the dots 35 of the recording dot pattern of FIG. 8 were to be printed without generating the shift dot pattern, the dot size D1 of each dot 35 needs to be set to a greater value to fill in space between the dots 35 when compared with the above-described case of generating the shift dot pattern.

Assuming that the recording dot pattern of FIG. 8 is to be output with the arrangement densities of 300 dpi*300 dpi, the dot size D1 of each dot 35 should be equal to or greater than about 120 μm such that more ink is adhered to the recording sheet 7. Further, forming the dots 35 based on the original recording dot pattern results in increased overlap area where the dots 35 are overlapped with one another. It is assumed that about 57% of the printed image corresponds to such overlap area. Since more ink is used to produce the printed image, excessive ink especially on the solid image area or the line image area may cause ink leakage or degradation in image quality.

In view of the above, in this example illustrated in FIG. 11, the shift dot pattern is generated by shifting the dots 35 of every other line in the recording dot pattern by p/2 in the main scanning direction. More specifically, the odd lines 31-1, 31-3, . . . , corresponding to the odd lines 31—odd of FIG. 9, are to be printed without being shifted. The even lines 31-2, 31-4 . . . , corresponding to the even lines 31-even of FIG. 9, are generated by shifting the positions of the dots by p/2 in the main scanning direction. Accordingly, the dots 35s of the shift dot pattern and the dots 35 of the recording dot pattern, which are adjacent in the sub-scanning direction, have less space therebetween. Since there is less space to be filled out, the dot size D1 of each dot 35 (35s) to be formed on the recording sheet 7 can be set to equal to at least 106 μm, which is about 13% less than the dot size that is otherwise required in case the recording dot pattern is printed without generating the shift dot pattern. Further, the overlap area where the dots 35 (35s) are overlapped with one another is assumed to be about 37% of the printed image. Accordingly, less ink is required to produce the printed image while maintaining a sufficient level of resolution.

With less ink adhered to the recording sheet, less time is required for drying the ink on the printed image, while suppressing occurrences of cockling or ink spreading. For example, the inkjet printer P is able to produce the printed image having a width that is defined by the total widths of 64 nozzles 14, as the inkjet print head 5 scans in the main scanning direction. As a number of transferring the recording sheet in the sub-scanning direction decreases, less time is required for processing one page of the printed image, thus increasing the processing speed.

The reduced amount of ink further prevents the recording sheet from being crumpled due to ink leakage, or prevents degradation in image quality. The reduced amount of ink further reduces the running costs of the inkjet printer P. Especially in case of printing a color image using yellow, magenta, cyan, and black ink, the above-described merits in producing the printed image with less ink tends to be high.

Further, in case a halftone image is to be generated, the inkjet printer P controls the number of dots per area based on the image density such that an area having the high densities have a greater number of dots per area. If the overlap area where the dots 35 are overlapped with one another is large, the increased number of dots for the high image density area does not stand out so much with respect to the overlap area. In this example, since the overlap area of the dots 35 is made smaller, linear relationship between the number of dots per area and the image density is maintained, thus improving the image quality in halftone image.

When the halftone image with lower image densities is to be generated, the inkjet printer P decreases the number of dots 35 per area. In this example, since the dot size, i.e., the dot diameter D1, of the dot 35 is small, the dots 35 in the lower image density area tends to have fine dot reproducibility, thus increasing the image quality in the halftone image.

On the other hand, if the overlap area of dots 35 decreases too much, the resultant printed image tends to be flattened as in case of the printed image generated using the technique described in Japanese Patent Application Publication No. H08-002003. In view of this, in this example, the overlap area of dots 35 is made sufficiently greater such that the printed image does not appear to be flattened. Further, as the adjacent dots 35 are sufficiently overlapped with one another, generation of white spots may be suppressed, which may be otherwise caused due to the change in ejection speed of the ink droplet 16 or the shift in landing position of the ink droplet 16.

As described above, the inkjet printer P is able to produce the printed image with improved image quality with less processing time, by printing the image based on the shift dot pattern of FIG. 11. In printing the image based on the shift dot pattern, the inkjet printer P preferably corrects the outline of the shift dot pattern to further improve the image quality in the printed image.

(Correcting an Outline of a Shift Dot Pattern with Correction Dots)

Now, operation of adding correction dots to the shift dot pattern to correct the outline of the shift dot pattern is explained according to an example embodiment of the present invention. FIG. 12(a) illustrates a dot arrangement of dots 35 in the shift dot pattern before replacing the dot with a small-size correction dot. FIG. 12(b) illustrates a dot arrangement of the dots 35 of FIG. 12(a) after the dot is replaced with the small-size correction dot. FIG. 13(a) illustrates a dot arrangement of dots 35 in the shift dot pattern before adding a small-size correction dot. FIG. 13(b) illustrates a dot arrangement of the dots 35 of FIG. 13(a) after the small-size correction dot is added. FIG. 14 illustrates a dot arrangement of the shift dot pattern of FIG. 11 after the outline of the shift dot pattern is corrected.

Figure 12:
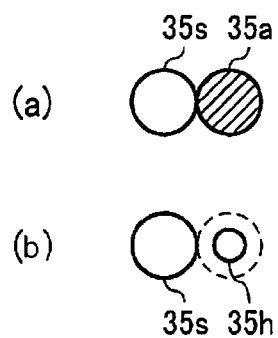
FIG. 12 is an illustration for explaining operation of replacing a dot in the shift dot pattern of FIG. 11 with a correction dot.

Referring to FIG. 12, the dot 35s, expressed in solid-line circle, is a dot that is positioned inside the shift dot pattern. The dot 35a, expressed in diagonal line circle, is a dot that is inside the shift dot pattern but partly runs over the outline of the unshifted dot pattern at the right sides. The correction dot 35h is expressed in solid-line circle with a smaller dot size. To correct the outline of the shift dot pattern, the dot 35a, which runs over the outline of the unshifted dot pattern, is replaced by the correction dot 35h.

Figure 13:
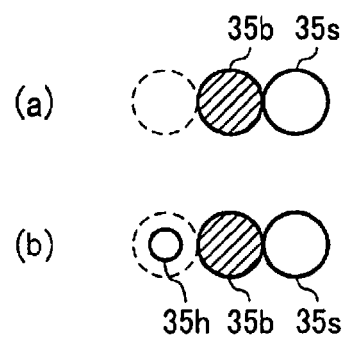
FIG. 13 is an illustration for explaining operation of adding a correction dot to the shift dot pattern of FIG. 11.
Figure 14:
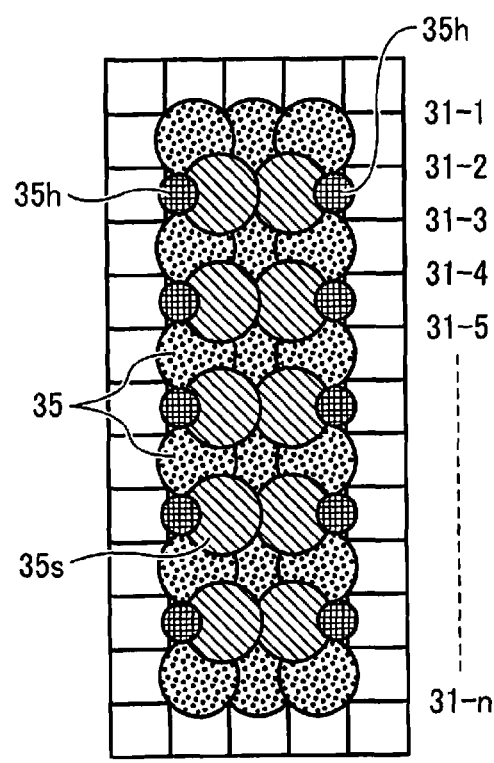
FIG. 14 is an illustration of a dot arrangement of a corrected shift dot pattern that is generated based on the shift dot pattern of FIG. 11.

Referring to FIG. 13, the dot 35b, expressed in diagonal line circle, is a dot that is shifted toward the inside of the shift dot pattern. The dashed line circle of FIG. 13 indicates a position of a non-printed dot, that is, a single-dot area of Null data. To correct the outline of the shift dot pattern that is caused by shift, the correction dot 35h is added to the position of the non-printed dot. More specifically, the Null data is converted to data of the correction dot 35h.

By performing the above-described correction for each line of the shift dot pattern of FIG. 11, the outline of the shift dot pattern is made smooth with respect to the outline of the unshifted recording dot pattern, thus improving the image quality in the printed image.

The above-described operation of correcting the outline of the shift dot pattern with the correction dots may be performed by the data processor 24 (FIG. 7), which is implemented by the microcomputer according to the shift dot pattern correction program, a hardware circuit such as the Application Specific Integrated Circuit (ASIC), or a combination of software and hardware.

Alternatively, any one of the above-described operations of generating a shift dot pattern and correcting the outline of the shift dot pattern may be performed by the host computer HC. In such case, the host computer HC generates a shift dot pattern based on a recording dot pattern of image data, corrects the outline of the shift dot pattern to generate the corrected shift dot pattern, and send data of the recording dot pattern and the corrected shift dot pattern to the inkjet printer P, according to various control programs stored in a memory.

Further, the above-described operation of generating the shift dot pattern and correcting the outline of the shift dot pattern may be performed in various other ways.

For example, in the above-described example, the correction dot 35h is formed on the recording sheet with a pitch that is the same as the pitch of forming the dot 35 of the recording dot pattern. Alternatively, the correction dot 35h may be formed on the recording sheet at a position that is closer to the dot 35 of the recording dot pattern that is adjacent, so as to reduce space between the dot 35 and the correction dot 35h. This improves the image quality in printed image.

Further, the above-described operation of generating the shift dot pattern and correcting the outline of the shift dot pattern may be selectively performed. For example, the inkjet printer P further includes an operation panel, which functions as a user interface that interacts with a user. The operation panel may be provided with a mode selection key, which allows the user to select one of a mode in which the printed image is generated based on the shift dot pattern, and a mode in which the printed image is generated based on the unshifted recording dot pattern. In case the user desires to print the image with the higher processing speeds, the user may select the mode in which the printed image is generated based on the recording dot pattern. In case the user desires to print the image with the improved quality or less ink, the user may select the mode in which the printed image is generated based on the shift dot pattern.

In another example, the data processor 24 of the inkjet printer P may be further provided with a function of recognizing the features of image data to be printed, such as a function of detecting a barcode area in the image data. When the data processor 24 detects the barcode area in the image data, the data processor 24 may generate the shift dot pattern from a recording dot pattern of the barcode area and correct the shift dot pattern such that the barcodes are printed with the improved accuracy. When the data processor 24 detects other features in the image data such as characters, figures, or pictures, the above-described operations of generating and correcting the shift dot pattern are not performed. This improves the image quality in case of printing the barcode area, while still keeping the high processing speeds.

Further, the above-described operation of correcting the outline of the shift dot pattern does not have to be performed after generating the shift dot pattern. In such case, the inkjet printer P prints the image based on the shift dot pattern, which is not corrected. The jaggies of the outline, which may be caused by the shifted dot that is shifted by p/2, is about 0.1 mm or less. Further, as ink tends to spread on the recording sheet, jaggies of the outline in the printed image may be compensated.

Figure 15:
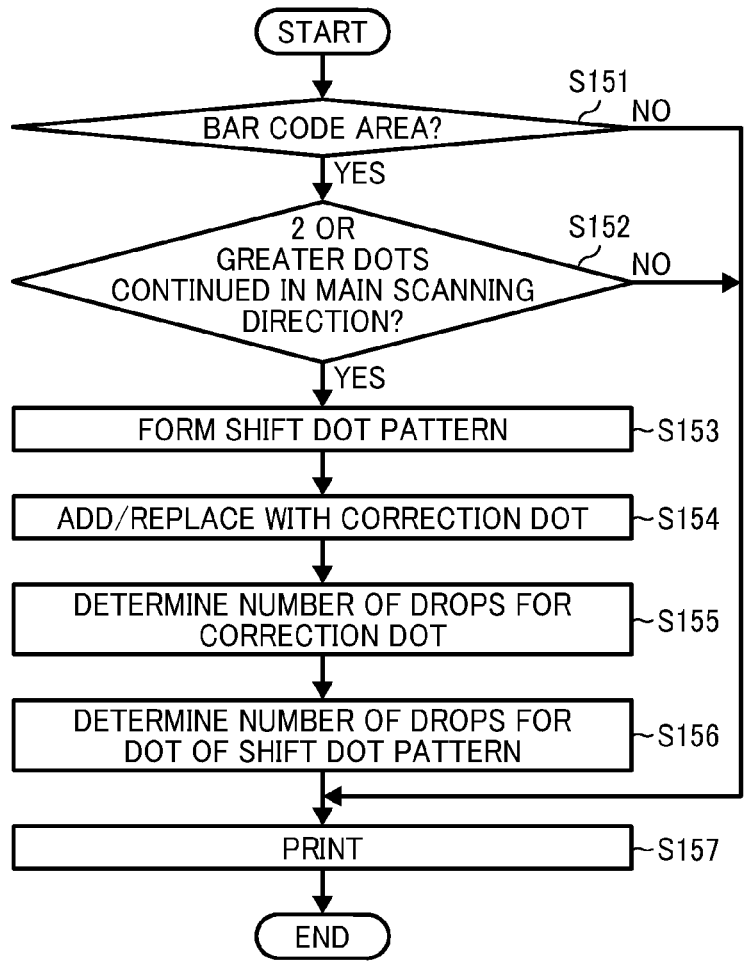
FIG. 15 is a flowchart illustrating operation of printing image data, performed by the image forming apparatus of FIG. 2, according to an example embodiment of the present invention.
Figure 16:
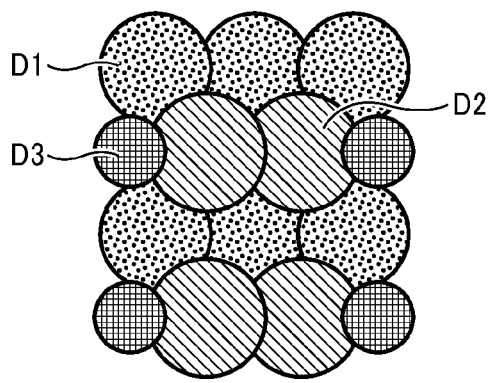
FIG. 16 is an enlarged view illustrating a portion of the corrected shift dot pattern of FIG. 14.

Referring now to FIG. 15, operation of printing an image based on a recording dot pattern of image data, performed by the inkjet printer P, is explained according to an example embodiment of the present invention. Operation of FIG. 15 is performed when the inkjet printer P receives an instruction for printing image data from the outside apparatus such as the host computer HC of FIG. 6. More specifically, when the print instruction is received from the host computer HC via the network interface, the data processor 24 of the inkjet printer P performs operation of FIG. 15.

At S151, the data processor 24 of the inkjet printer P determines whether a barcode area is detected in the image data to be printed. When it is determined that there is no barcode area in the image data ("NO" at S151), the operation proceeds to S157 to cause the inkjet print head 5 to print the image data based on the recording dot pattern, and the operation ends. When it is determined that there is the barcode area in the image data ("YES" at S151), the operation proceeds to S152.

At S152, the data processor 24 of the inkjet printer P determines whether two or more dots D1 are sequentially arranged in the main scanning direction A in the barcode area of the image data, by referring to the barcode data to be printed. More specifically, it is assumed that a continuous run of dots corresponds to the bar in the barcode area of the image data, which is subjected for processing. When it is determined that two or more dots D1 are sequentially arranged in the main scanning direction A ("YES" at S152), the operation proceeds to S153. When it is determined that there are no two or more dots D1 that are sequentially arranged in the main scanning direction A ("NO" at S152) in the barcode area of the image data, the operation proceeds to S157 to cause the inkjet print head 5 to print the image data based on the recording dot pattern, and the operation ends.

At S153, assuming that the sheet transfer direction is the same as the sub-scanning direction B, and that the sheet width direction is the same as the main scanning direction A, the data processor 24 of the inkjet printer P generates a shift dot pattern having dots D2 by shifting the positions of dots D1 of the recording dot pattern by p/2 in the main scanning direction A for every other lines of the dots D1 that are adjacent in the sub-scanning direction, in a substantially similar manner as described above referring to FIGS. 9 to 11.

At S154, the data processor 24 of the inkjet printer P corrects the outline of the barcode data, which becomes jaggy as the shift dot pattern is generated, to generate a corrected shift dot pattern. More specifically, the correction dot D3 having a smaller dot size is added to fill in space as the dot is shifted towards the inside of the dot pattern, as described above referring to FIG. 13. The dot, which runs over the outline of the barcode data, is replaced with the correction dot D3 having a smaller dot size, as described above referring to FIG. 12.

At S155, the data processor 24 of the inkjet printer P determines a number of ink droplets, i.e., the number of ink drops, for the correction dot D3, according to the estimated value of shift in landing position of the ink droplet to be ejected from the nozzle 14. More specifically, with the greater estimated value of shift in landing position of the ink droplet, the number of droplets for the correction dot D3 is made greater than a default value to cause the dot size, i.e., the dot diameter, of the correction dot D3 to increase to compensate for the shift. With the less estimated value of shift in landing position of the ink droplet, the number of droplets for the correction dot D3 is set to the default value, which is determined to be within a predetermined range of a few drops.

At S156, the data processor 24 of the inkjet printer P determines a number of ink droplets for each dot D2 of the corrected shift dot pattern, based on the estimated value of shift in landing position of ink droplet to be ejected from the nozzle 14, and an estimated amount of consumption of ink for generating the printed image of the image data. More specifically, with the increased estimated amount of ink consumption, the data processor 24 decreases a number of ink droplets to be used for producing the shifted dot in the corrected shift dot pattern, for example, by decreasing the number of ink droplets of each dot D2 or a selected number of dots D2. In order to control the image appearance of the barcode area, the data processor 24 may apply further processing as described below referring to FIG. 21. In this example, the estimated amount of ink consumption may be calculated based on image data to be printed.

At S157, the data processor 24 of the inkjet printer P sends data including the recording dot pattern and the corrected shift dot pattern to the head drive controller 28 via the print processor 25 to cause the inkjet print head 5 to eject ink droplets from the desire nozzle 14 to form the dots onto the recording sheet 7 based on the data of dot pattern with the increased number of droplets that are determined at S156 and S157, and the operation ends.

The above-described operation of FIG. 15 may be performed in various other ways. For example, any one of the above-described steps of FIG. 5 may be performed by the host computer HC (FIG. 6), such as by the CPU 17 according to control programs stored in the memory.

In alternative to determining whether to generate a shift dot pattern based on whether the barcode area is detected, the data processor 24 may determine to generate a shift dot pattern according to a user preference, which may be input through the operation panel. Further, any one of the operation of correcting the outline of the barcode data performed at S154, the operation of adjusting a number of ink droplets for the correction dot based on the estimated shift value, the operation of adjusting a number of ink droplets for the shift dot pattern based on the estimated shift value and the estimated ink consumption may not be performed.

Referring now to FIGS. 16, 17A, 17B, and 17C, operation of controlling the dot size of the correction dot D3 to compensate for the shift in landing position of ink droplet is explained according to an example embodiment of the present invention. In this example, to compensate for the shift in landing position of ink droplet, the number of ink droplets for the correction dot D3 of one pixel of image data is increased by 2 to 3, or 2 to 4 drops, although the specific increased value may depend on various parameters such as a type of recording sheet to be used or a user preference. With the increase in number of droplets by 2 to 3 drops, the size of a correction dot that originally has a diameter of 40 μm is increased by about 25% such that the shift in landing position of droplet that is up to 5 μm can be compensated.

Figure 17C:
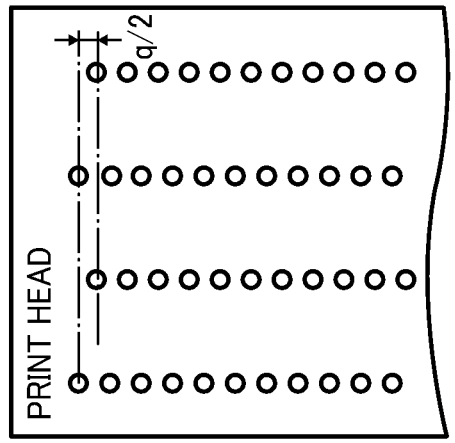
FIG. 17C is an illustration for explaining an example arrangement of nozzles on a print head of the image forming apparatus of FIG. 2 in which two nozzles are arranged at the same sub-scanning positions.
Figure 17B:
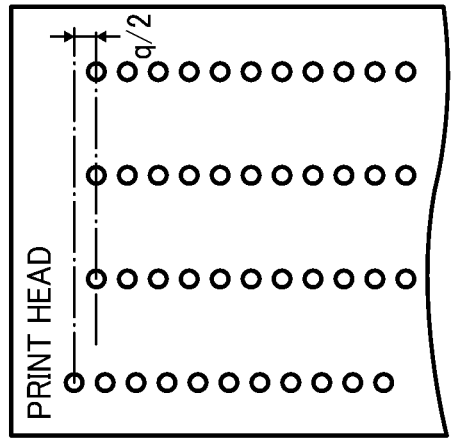
FIG. 17B is an illustration for explaining an example arrangement of nozzles on a print head of the image forming apparatus of FIG. 2 in which three nozzles are arranged at the same sub-scanning positions.
Figure 17A:
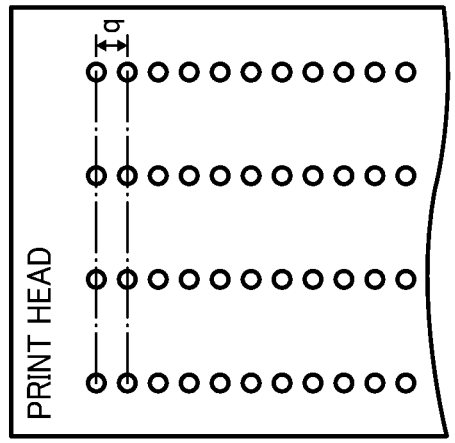
FIG. 17A is an illustration for explaining an example arrangement of nozzles on a print head of the image forming apparatus of FIG. 2 in which all four nozzles are arranged at the same sub-scanning positions.

FIGS. 17A to 17C each illustrate an example arrangement of nozzles 14, which are mounted on the inkjet print head 5 of the inkjet printer P. FIG. 17A illustrates the example case in which all nozzles 14 are aligned at the same positions in the sub-scanning direction. FIG. 17B illustrates the example case in which three nozzles 14 are aligned at the same positions in the sub-scanning direction. FIG. 17C illustrates the example case in which two nozzles 14 are aligned at the same positions in the sub-scanning direction. The inkjet printer P determines a combination of ink droplets that are used to increase the dot size of the correction dot D3 of FIG. 16, based on the nozzle positions of the inkjet print head 5 and the estimated printing speed of the inkjet print head 5. Such information may be previously stored in a memory of the inkjet printer P.

Assuming that the inkjet printer P is a color printer capable of printing a color image using cyan (C) ink, magenta (M) ink, yellow (Y) ink, and black (K) ink, the possible nozzle positions of the 4-color print head 5 are mainly classified into the example cases illustrated in FIGS. 17A to 17C. To increase the dot size of the correction dot D3, a number of ink droplets for forming the correction dot D3 are increased using one of the following methods: (1) adding four drops that together reproduce a composite color Bk including the respective drops of C, M, Y, and K color ink; (2) adding three drops that together reproduce a composite color Bk including the respective drops of C, M, and Y color ink; (2) adding two drops of a composite color including one drop of K ink and one drop of ink having a color other than K color; and (4) adding two drops of a composite color including drops of ink to be ejected, respectively, from the nozzles each of which are arranged at a position shifted by the position where the K color nozzle is arranged.

When any one of the methods (1), (2), and (3) is used to increase the dot size of the correction dot D3 that forms the black barcode, since any one of the drops includes a droplet of black color ink, the resultant printed image of barcode looks more natural. Assuming that all nozzles are arranged at the same sub-scanning positions as illustrated in FIG. 17A, the printed image having the correction dot D3 is formed based on the recording dot pattern having a sub-scanning direction dot pitch q, by one line of scanning.

Assuming that C, M, and Y color nozzles are arranged at the same sub-scanning positions as illustrated in FIG. 17B, the printed image having the correction dot D3 is formed based on the recording dot pattern having a sub-scanning direction dot pitch q/2, by one line of scanning, using any one of the methods (2) and (4).

Assuming that two nozzles are arranged in the same sub-scanning positions as illustrated in FIG. 17C, the printed image having the correction dot D3 is formed based on the recording dot pattern having a sub-scanning direction dot pitch of q/2, by one line of scanning, using any one of the methods (3) and (4). For example, when K and Y color nozzles are arranged at the same sub-scanning positions, and C and M color nozzles are arranged at the other same sub-scanning positions, the method (3) or (4) may be used.

In case the inkjet print head 5 includes two or more nozzle arrays for K color, the method (3) or (4) may be applied while increasing a number of times for scanning to repeatedly print using the K color ink more than once. For example, when two nozzle arrays for K color are arranged, the inkjet printer head 5 may increase the dot size of the corrected shift dot pattern by ejecting two droplets of ink having a black color, by increasing a number of scans. When compared with the case where three or four droplets of ink are ejected, an amount of ink consumption is suppressed while reproducing the black color.

In case two drops of different colors are used to form the correction dot D3, a combination of two colors having low brightness values may be used, such that the color that is similar in brightness to the black color of the recording dot pattern is reproduced.

In the above-described examples, it is assumed that the nozzles of the respective colors are each arranged on one head in one array. Alternatively, one head may be provided with more than one array of nozzles for each or any desired color. In either of these cases, the correction dot D3 may be formed using any one of the above-described methods.

Figure 18A:
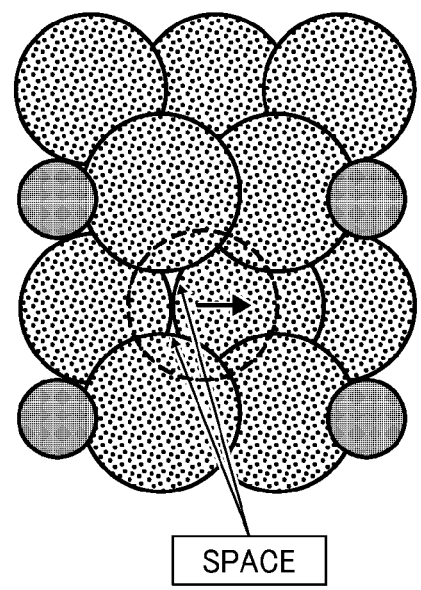
FIG. 18A is an illustration for explaining an example dot arrangement of a printed image in which the landing positions of ink droplets forming the dot are shifted, when the printed image is generated using the method described in the prior art.
Figure 18B:
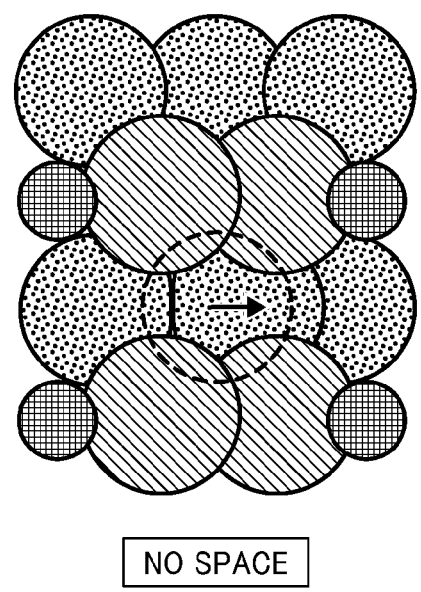
FIG. 18B is an illustration for explaining an example dot arrangement of a printed image in which the landing positions of ink droplets forming the dot are shifted, according to an example embodiment of the present invention.

FIGS. 18A and 18B both illustrate example cases in which the landing position of ink droplets forming the dot D1 of the recording dot pattern is shifted by 15 μm from the position shown in dashed line circle. FIG. 18A illustrates the example case in which the printed image is generated using the inkjet printing method described in Japanese Patent Application Publication No. 2003-089199. Referring to FIG. 18A, as the landing position of ink droplets forming the dot D1 is shifted toward right in the main scanning direction, space is generated.

FIG. 18B illustrates the example case in which the printed image is generated using the inkjet printing method according to one example of the present invention. With the increased number of droplets for each dot D2 of the shift dot pattern, for example, by two to four drops, the dot size of the shift dot pattern is increased such that space is filled even when the landing position of ink droplets forming the dot D1 is shifted. In this example case illustrated in FIG. 18B, the number of droplets of ink forming the dot D2 is increased by 2 drops to increase the dot size of the shift dot pattern by about 10%. The dot size of the dot D2 of the shift dot pattern may be increased using any one of the methods described above referring to FIGS. 17A to 17C. The number of drops to be increased may be determined based on empirical data, which is obtained by measuring the values of shift in landing positions of ink droplets by printing images using the inkjet printer P. Based on the measured values of shift, a dot size that is sufficient to fill in space generated by the shift is obtained for each one of the measured values of shift. Using the calculated values of dot size, a number of ink droplets for forming a dot having a specific dot size is obtained for each one of the calculated values of dot size.

Figure 19:
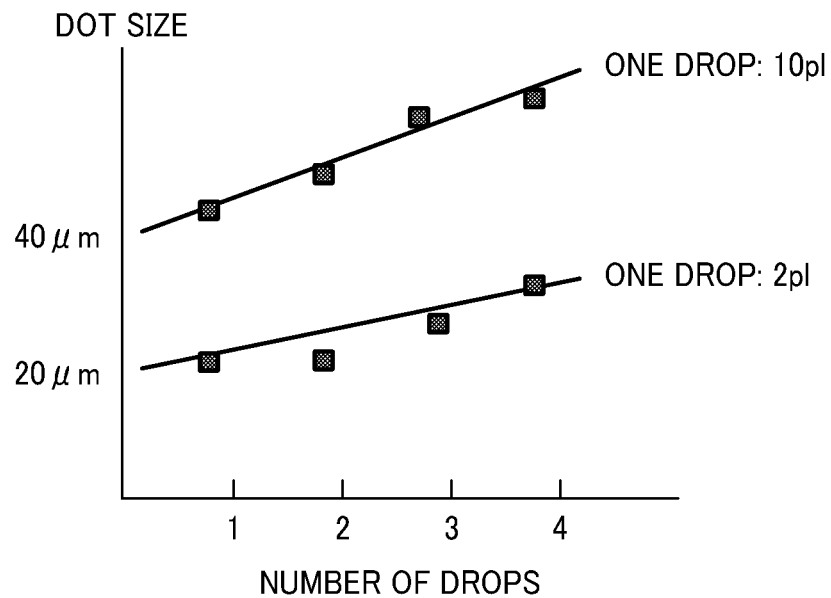
FIG. 19 is a graph illustrating the relationship between a number of ink droplets that form a dot, and a dot size of the dot.

FIG. 19 is a graph illustrating the relationship between a number of ink droplets ("NUMBER OF DROPS") for forming one pixel of image data, and a dot size of the dot formed by the ink droplets. With the increase in number of ink droplets, the dot size of the dot increases. It is assumed that the amount of ink consumption doubles as the number of ink droplets increases by one drop.

Figure 20:
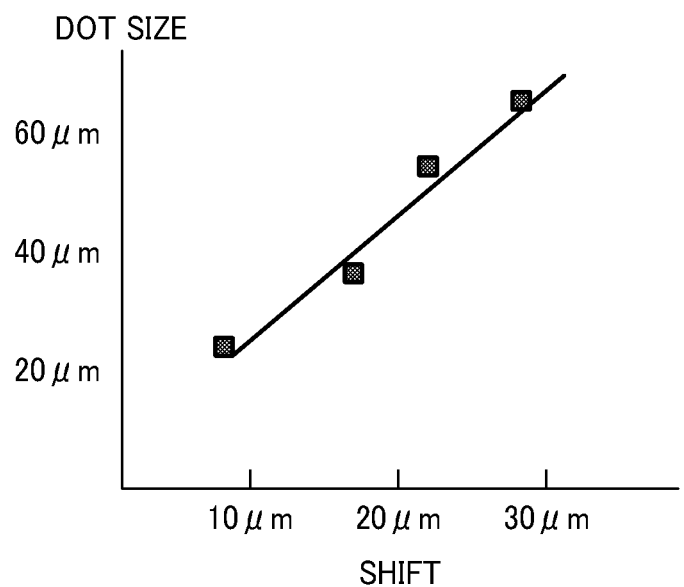
FIG. 20 is a graph illustrating the relationship between a value of shift in landing position of ink droplets, and a dot size of the dot that is required to fill in space caused by the shift.

FIG. 20 is a graph illustrating the relationship between the value of a shift in landing position of ink droplet ("SHIFT"), and a dot size of the dot that is required to fill in space caused by the shift ("DOT SIZE"). With the increase in value of shift, the dot size of the dot needed to compensate for the shift increases.

The data indicating the relationship between the dot size and the number of ink droplets (FIG. 19), and the data indicating the relationship between the dot size and the shift value (FIG. 20) may be obtained for one or more types of inkjet printers. Based on these data, a number of ink droplets for the correction dot D3 and the dot D2 of the shift dot pattern may be respectively calculated.

More specifically, in this example, the data indicating the relationship between the dot size and the number of ink droplets, and the data indicating the relationship between the dot size and the shift value, for the inkjet printer P are stored in a nonvolatile memory of the inkjet printer P. Using the data indicating the relationship among the dot size, the number of ink droplets, and the shift value, the CPU of the data processor 24 determines the number of ink droplets required to increase the dot size of the correction dot 3 or the dot D2 of the shift dot pattern. For example, using the empirical data obtained for the inkjet printer P, the data processor 24 may set the increased number of ink droplets to a default value, which is the average value obtained from the empirical data. In another example, the data processor 24 may determine the increased number of ink droplets using the empirical data, based on an estimated value of shift in landing position of ink droplets that may be obtained using various sensor outputs such as the printing speed.

Figure 21A:
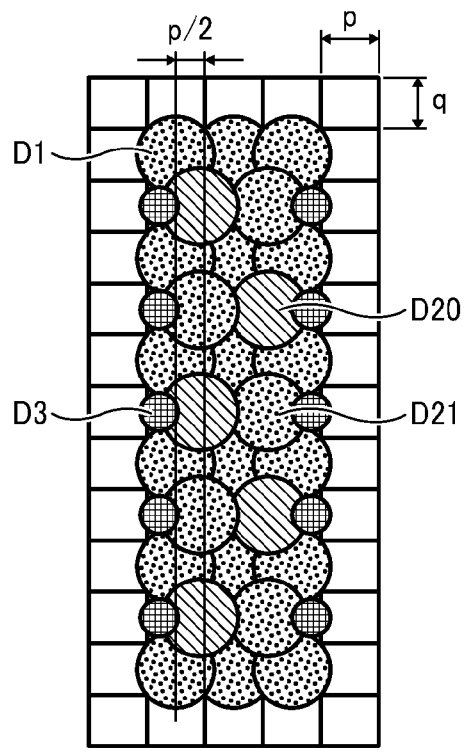
FIG. 21A is an illustration of a dot arrangement of a corrected shift dot pattern that is generated based on the shift dot pattern of FIG. 11, when half of the dots in the shift dot pattern are formed with the increased dot size.
Figure 21B:
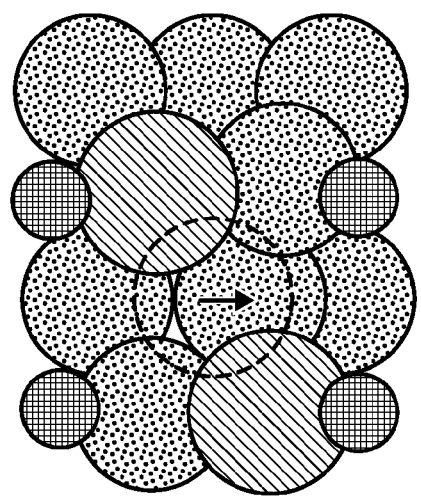
FIG. 21B is an illustration for explaining an example dot arrangement of a printed image in which the landing positions of ink droplets forming the dot are shifted, when printing the printed image based on the shift dot pattern of FIG. 21A, according to an example embodiment of the present invention.

In alternative to equally increasing the dot size for each dot D2 of the shift dot pattern, only a selected number of dots D2 in the shift dot pattern may have the increased dot size. More specifically, as illustrated in FIGS. 21A and 21B, half of the dots D2 forming the shift dot pattern may be caused to be produced with the increased dot size. More specifically, as illustrated in FIG. 21A, the dots of the shift dot pattern are classified into the dot D20 having the increased dot size, and the dot D21 having a dot size that is equal to the dot size of the unshifted original dot D1. The dot D21 may be formed with the increased number of ink droplets, for example, by two to four drops. Since only about half of the dots in the shift dot pattern are formed with the increased dot size, the overall amount of ink consumption is reduced by about half when compared with the above-describe example case of FIG. 18B. Even with the decreased number of dots D2 to be formed with the increased dot size, as illustrated in FIG. 21B, the resultant printed image is able to sufficiently compensate for the shift in landing position of a dot in the recording dot pattern.

Alternatively, the number of ink droplets for each dot D2 in the shift dot pattern may be equally changed to have smaller values to decrease ink consumption. Alternatively, the inkjet printer P may cause about half of the dots D2 in the shift dot pattern to be formed with the increased dot size, only in case the shift dot pattern is formed with two or more dots that are sequentially arranged.

The dot size of the dot D20 in the shift dot pattern may be increased using any one of the methods described above referring to FIGS. 17A to 17C. Further, the number of ink droplets to be used for increasing the dot size of the dot D20 may be determined based on empirical data that estimates a shift in landing position of ink droplet, as described above referring to FIGS. 19 and 20.

Further, in this example, it is assumed that the barcodes in the barcode area of image data are arranged in the main scanning direction as illustrated in FIG. 22A, which is the same as the printing direction along which the inkjet print head 5 scans. Alternatively, as illustrated in FIG. 22B, the barcodes in the barcode area of image data may be arranged in the sub-scanning direction that is orthogonal to the printing direction. In such case, at S152 of FIG. 15, when the inkjet printer P determines that three or more dots forming the barcodes are sequentially arranged in the sub-scanning direction, the operation proceed to S153 to generate a shift dot pattern. When the inkjet printer P determines that two or less dots forming the barcodes are sequentially arranged in the sub-scanning direction, the operation proceeds to S157.

As described above, when the inkjet printer P detects a barcode area in image data to be printed, the inkjet printer P causes the inkjet print head 5 to scan in the bi-directional main scanning direction for a number of times that is determined based on the head resolution and the printing resolution. In order to improve image quality in the barcode area, the inkjet printer P generates a shift dot pattern by shifting dots of a recording dot pattern of the image data, by half of a main scanning direction dot pitch in the main scanning direction, for every other lines of the recording dot pattern. This suppresses excessive ink from being adhered to the recording sheet.

The inkjet printer P further corrects the jaggy on the outline of the shift dot pattern, which is caused by shift, by adding smaller-size correction dots to generate a corrected shift dot pattern.

The inkjet printer P further increases a number of ink droplets that form the correction dot or the dot of the shifted dot pattern based on an estimated value of shift in landing positions of ink droplets, thus compensating for negative influences that may be caused due to the shift.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, any of the above-described devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in an image forming apparatus that forms a dot pattern image based on a recording dot pattern of image data on a recording medium by ejecting ink droplets from a plurality of nozzles mounted on a print head. The image forming apparatus includes the print head that scans in a main scanning direction, while facing toward a recording surface of the recording medium; and means for transferring the recording medium toward the print head in a sub-scanning direction. In one example, the print head corresponds to the inkjet print head 5, and the means for transferring corresponds to the platen motor 29, gears 8 and 9, and the platen 10. The plurality of nozzles, which form the dot pattern image, are arranged in the main scanning direction by a predetermined dot pitch. The image forming apparatus further includes: determining means for determining whether barcode data is included in the image data to be printed; shift dot pattern generating means for shifting dots of the recording dot pattern by a distance that is equal to half of the predetermined dot pitch in the main scanning direction for every other lines of the recording dot pattern to generate a shift dot pattern, when the determining means determines that the barcode data is included in the image data to be printed; outline correcting means for correcting jaggy of the shift dot pattern with respect to the unshifted recording dot pattern to generate a corrected shift dot pattern by adding a correction dot or replacing with the correction dot; shift dot pattern ink calculating means for calculating a number of ink droplets to be additionally ejected from at least one of the nozzles for forming a dot of the shift dot pattern based on an estimated shift value indicating the displacement in landing position of ink droplets forming the dot of the recording dot pattern; and correction dot ink calculating means for calculating a number of ink droplets to be additionally ejected from at least one of the nozzles for forming the correction dot based on the estimated shift value indicating the displacement in landing position of ink droplets forming the dot of the recording dot pattern. In one example, the determining means, the shift dot pattern generating means, the outline correcting means, the shift dot pattern ink calculating means, and the correction dot ink calculating means correspond to the data processor 24, which may be implemented by software, hardware, or a combination of hardware and software.

What is claimed is:

1. An image forming apparatus, comprising:
   a print head on which a plurality of nozzles are mounted by a dot pitch in a main scanning direction;
   a head drive controller to cause the print head to eject droplets of ink to form a dot pattern of image data on a recording sheet being transferred in a sub-scanning direction; and
   a data processor to:
   detect a barcode area included in image data to be printed to obtain a recording dot pattern from the barcode area of the image data;
   shift dots of the recording dot pattern on every other line in a sub-scanning direction, by half of the dot pitch in the main scanning direction, to generate a shift dot pattern including shifted dots;
   correct a jagged outline of the shift dot pattern caused by the shifted dots on an outline section of the barcode area using correction dots to generate a corrected shift dot pattern, the corrected shift dot pattern including the shifted dots and the correction dots;
   determine an increased number of ink droplets to be additionally ejected from one or more of the plurality of nozzles to form at least one of the shifted dots or at least one of the correction dots of the corrected shift dot pattern with an increased dot size, based on an estimated shift value indicating the displacement in landing position of ink droplets forming one of the dots of the recording dot pattern; and
   send data of the corrected shift dot pattern to the head drive controller to cause the print head to eject droplets of ink based on the corrected shift dot pattern, with the determined increased number of ink droplets.

2. The image forming apparatus of claim 1, wherein the correction dots have a diameter less than a diameter of the dots of the recording dot pattern or a diameter of the shifted dots of the shift dot pattern.

3. The image forming apparatus of claim 1, wherein shifted dots to be formed with the increased dot size includes all shifted dots that are included in the shift dot pattern.

4. The image forming apparatus of claim 1, wherein shifted dots to be formed with the increased dot size includes half of the shifted dots that are included in the shift dot pattern.

5. The image forming apparatus of claim 2, wherein the data processor causes the print head to increase the dot size of the at least one shifted dot or the at least one correction dot of the corrected shift dot pattern by additionally ejecting four ink droplets of respective colors of cyan, magenta, yellow, and black that together reproduce a composite black color.

6. The image forming apparatus of claim 2, wherein the data processor causes the print head to increase the dot size of the at least one shifted dot or the at least one correction dot of the corrected shift dot pattern by ejecting three ink droplets of respective colors of cyan, magenta, and yellow that together reproduce a composite black color.

7. The image forming apparatus of claim 2, wherein the data processor causes the print head to increase the dot size of the at least one shifted dot or the at least one correction dot of the corrected shift dot pattern by ejecting one ink droplet of black and one ink droplet having a color other than black.

8. The image forming apparatus of claim 2, wherein the data processor causes the print head to increase the dot size of the at least one shifted dot or the at least one correction dot of the corrected shift dot pattern by ejecting two ink droplets, respectively, from the nozzles that are arranged at positions shifted by a dot pitch in the sub-scanning direction from a position at which the nozzle for black color is arranged.

9. The image forming apparatus of claim 1, wherein,
when the bars in the barcode area of the image data are arranged in the main scanning direction, the data processor determines that the barcode area is detected in the image data when two or more dots are sequentially arranged in the main scanning direction, and
when the bars in the barcode area of the image data are arranged in the sub-scanning direction, the data processor determines that the barcode area is detected in the image data when three or more dots are sequentially arranged in the sub-scanning direction.

10. The image forming apparatus of claim 2, wherein the data processor causes the print head to increase the dot size of the at least one shifted dot or the at least one correction dot of the corrected shift dot pattern by ejecting two ink droplets of different colors having low brightness values.

11. The image forming apparatus of claim 1, further comprising:
a memory to store data indicating relationship between the value of a shift in landing position of ink droplets that form at least one of the dots of the recording dot pattern, and a number of ink droplets that are needed to form an increased dot size of the at least one dot to fill out space caused by the shift in landing position of ink droplets, wherein the data processor obtains the increased number of ink droplets to be additionally ejected using the stored data.

12. The image forming apparatus of claim 1, wherein the data processor determines the increased number of ink droplets to be additionally ejected to form the at least one shifted dot, based on an estimated amount of ink consumption for generating the dot pattern of image data in addition to the estimated shift value.

13. An image forming system of claim 1, comprising:
the image forming apparatus of claim 1; and
an information processing apparatus to generate the image data to be printed according to a user instruction, and send a print instruction to the image forming apparatus to cause the image forming apparatus to print the dot pattern of image data.

14. An image forming method, comprising:
detecting a barcode area included in image data to be printed to obtain a recording dot pattern from the barcode area of the image data;
shifting dots of the recording dot pattern on every other line in a sub-scanning direction, by half of a dot pitch in a main scanning direction, to generate a shift dot pattern including shifted dots;
correcting a jagged outline of the shift dot pattern caused by the shifted dots on an outline section of the barcode area using correction dots to generate a corrected shift dot pattern, the corrected shift dot pattern including the shifted dots and the correction dots;
determining an increased number of ink droplets to be additionally ejected from one or more of the plurality of nozzles to form at least one of the shifted doth or at least one of the correction dots of the corrected shift dot pattern with an increased dot size, based on an estimated shift value indicating the displacement in landing position of ink droplets forming at least one of the dots of the recording dot pattern; and
sending data of the corrected shift dot pattern to cause a print head of an image forming apparatus to eject droplets of ink based on the corrected shift dot pattern, with the determined increased number of ink droplets.

15. A non-transitory recording medium storing a plurality of instructions which, when executed, cause a processor to perform an image forming method, the method comprising:
detecting a barcode area included in image data to be printed to obtain a recording dot pattern from the barcode area of the image data;
shifting dots of the recording dot pattern on every other line in a sub-scanning direction, by half of a dot pitch in a main scanning direction, to generate a shift dot pattern including shifted dots;
correcting a jagged outline of the shift dot pattern caused by the shifted dots on an outline section of the barcode area using correction dots to generate a corrected shift dot pattern, the corrected shift dot pattern including the shifted dots and the correction dots;
determining an increased number of ink droplets to be additionally ejected from one or more of the plurality of nozzles to form at least one of the shifted doth or at least one of the correction dots of the corrected shift dot pattern with an increased dot size, based on an estimated shift value indicating the displacement in landing position of ink droplets forming at least one of the dots of the recording dot pattern; and
sending data of the corrected shift dot pattern to cause a print head of an image forming apparatus to eject droplets of ink based on the corrected shift dot pattern, with the determined increased number of ink droplets.

* * * * *